United States Patent
Leitz et al.

[11] 4,037,238
[45] July 19, 1977

[54] STILL POCKET CAMERA

[75] Inventors: Ludwig Leitz, Wetzlar, Germany; Walter Mandler, Midland, Canada

[73] Assignee: Ernst Leitz G.m.b.H., Wetzlar, Germany

[21] Appl. No.: 610,689

[22] Filed: Sept. 5, 1975

[30] Foreign Application Priority Data

Sept. 21, 1974   Germany ............................ 2445289

[51] Int. Cl.$^2$ ...................... G03B 19/12; G02B 15/00
[52] U.S. Cl. ..................................... 354/152; 350/187
[58] Field of Search ............... 354/152, 153, 155, 197, 354/150, 275; 350/184, 185, 187

[56] References Cited

U.S. PATENT DOCUMENTS

| 3,145,634 | 8/1964 | Dicke | 354/152 |
| 3,426,666 | 2/1969 | Nagata | 354/152 |
| 3,850,507 | 11/1974 | Uesugi | 350/187 |
| 3,876,290 | 4/1975 | Back | 350/187 |
| 3,879,743 | 4/1975 | Wick et al. | 354/275 X |
| 3,956,759 | 5/1976 | Karikawa | 354/152 X |

FOREIGN PATENT DOCUMENTS

| 1,340,593 | 9/1963 | France | 354/155 |
| 1,108,066 | 5/1961 | Germany | 354/152 |
| 390,044 | 7/1965 | Switzerland | 354/152 |

OTHER PUBLICATIONS

Young Photography, 7/1975, Announcements page. Single-Lens Reflex Pocket Camera with Built-in Zoom Lens.

*Primary Examiner*—Donald A. Griffin
*Attorney, Agent, or Firm*—Gilbert L. Wells

[57] ABSTRACT

An improved photographic still pocket camera, where the film is inserted in a cassette provided with a feed part or spool and a take-up part or spool, these parts or spools connected by a film guide ledge. A zoom lens is mounted inside the camera, with the picture-taking beam path of the zoom lens located essentially parallel to the film plane and hence transverse to the direction of picture taking. The movable lens elements of the zoom lens are also movable parallel to the film plane.

18 Claims, 4 Drawing Figures

STILL POCKET CAMERA

CROSS-REFERENCE TO A RELATED APPLICATION

Applicants claim priority under 35 U.S.C. 119 for application P 24 45 289.9, filed Sept. 21, 1974, in Federal Republic of Germany.

BACKGROUND OF THE INVENTION

The present invention relates to a still pocket camera with cassette film insertion, comprising a feed and a take-up spool or part, both connected by a film guide step.

The cameras under consideration in the present application make use of films of lesser width than for the conventional 35 mm cinematographic or ordinary film, and generally are termed "pocket cameras" in the trade. They are of relatively small dimensions and of flat design so as to conveniently fit into the pockets of clothin apparel.

Such cameras are known as direct viewing types and also as mirror reflex cameras. It is further known to provide them with interchangeable objectives in the sense that several attachment objectives may be placed in front of a basic one, pictures therefore being taken if desired with lenses of varying focal lengths. One encounters, however, the drawback of having to connect the attachment objectives to the camera in such a manner that they protrude from the housing. Therefore, the camera loses that compactness and handling facility which do characterize it with respect to others. Hence one may no longer speak of a pocket camera.

SUMMARY OF THE INVENTION

Having in mind the limitations of the prior art, it is an object of the present invention to endow a pocket camera with the capability of taking pictures of various fields of view without thereby enlarging the external camera dimensions.

This object is achieved in that a zoom lens is mounted in the camera, the picture light beam being essentially parallel to the film plane and hence transverse to the direction the camera is pointing at, and wherein the movable lens elements may also be moved parallel to the film plane.

In this manner it becomes feasible within certain limits to take pictures at varying field-of-view angles without thereby having to enlarge the camera on account of interchangeables lenses or attachment lenses. Furthermore, the use of zoom lenses brings with the inherent advantage of the angle of view being continuously variable, in contrast to the step-wise variation of interchangeable lenses.

Though basically it is possible to design a camera with a zoom lens according to the present invention as a direct viewing camera, the viewer then requiring the same or a similar zoom lens, such a design of the objective however primarily is suited for a mirror reflex camera in which the picture beam and the viewer beam coincide at least partly. Accordingly to the present invention it is proposed to so mount the zoom lens of such a camera that at least part of the viewer beam also is parallel to the film plane.

The imaging or focusing optics of the zoom lens may be designed as pure lens element optics, or the optics may also comprise one or more mirror systems. Especially a splitting hexahedron or prism with a polarizing interference layer is recommended as a mirror system, two adjacent hexahedron surfaces each being occupied by one mirror lens, there being insertion of one λ/4 foil or plate in each case.

One of the splitting prisms is mounted on a straight line in front of the film window and may be rotated by 90° between two end positions. In one position the prism reflects the rays from the objective to the film (picture taking position), and in the other, it reflects these rays into the ocular (viewer position). In order to indicate focus of the objective for the given object, an indicator such as ground glass, a prismatic grating and the like is mounted in one intermediate focal plane. This indicator must be removed from the path of the rays when the picture is being taken. It is proposed therefore to so connect it with the splitter prism that simultaneously with the rotation of that prism into the picture taking position, the indicator is automatically removed from the beam path.

BRIEF DESCRIPTION OF THE DRAWINGS

Further characteristics of the present invention are made obvious by the drawings, which represent several embodiments, wherein.

DESCRIPTION OF THE PREFERRED EMBODIMENTS

Figure 1:
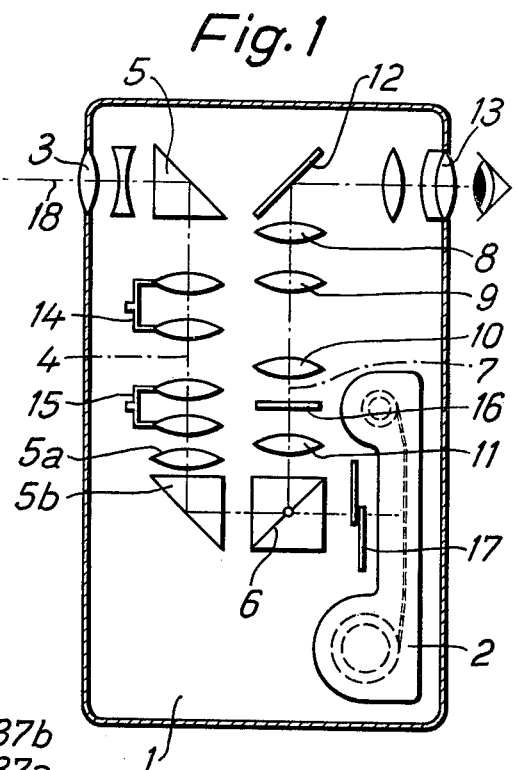
FIG. 1 is a schematic view of a mirror-reflex pocket camera with zoom lens for narrow film, as a first embodiment with a direct viewer beam parallel to the beam path for taking pictures.

The schematically shown camera housing 1 of FIG. 1 receives film loaded cassette 2. The front element of the objective is designated by 3. The picture taking beam passes along optical axis 18 through element 3, through a 90° deflecting prism 5 of the zoom part of the objective, through an element 5a and a further 90 deflecting prism 5b to a splitting prism 6 in front of cassette 2. Splitting prism 6 splits viewer beam 7 passing through several lens elements 8 – 11 and through a further reflex mirror 12 to ocular 13.

Again the zoom part of the objective is indicated merely in schematic form; it consists of two lens element groups 14 and 15 which may be shifted along the optic axis. Examples of the lens element groups 14 and 15 and the means for shifting are disclosed in U.S. Pat. No 3,876,290.

A ground glass grating 16 is provided to assess focus. Focusing itself is implemented by shifting lens element 5a parallel to the film plane.

the camera shutter is designated by 17 and is located in front of cassette 2.

Even though the components are shown only in schematic manner for the sake of simplification, the concept of the invention is clearly recognizable; the zoom objective is mounted inside the camera housing at such a locating that both the picture taking beam and the viewer beam essentially are parallel to the plane of the film and furthermore, the movable members of the zoom optics may also be displaced parallel to that film plane.

Figure 2:
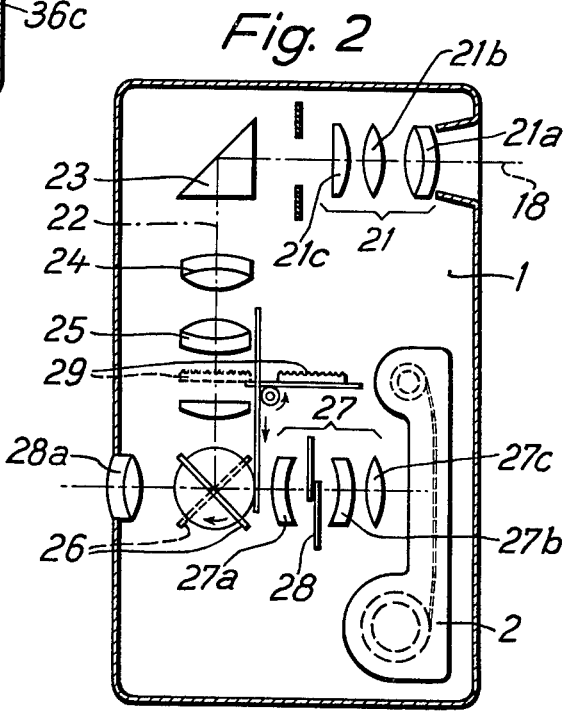
FIG. 2 is a schematic view of a mirror reflex pocket camera for narrow film, with zoom lens, as a second embodiment, the zoom lens optics consisting solely of lens elements.

This concept of the present invention is also realized in the embodiment of FIG. 2. Again the camera housing and the film cassette are respectively designated by 1 and 2. The imaging part of the objective consists solely of lens element optics, group 21, namely elements 21a, 21b and 21c, forming the group of front elements. The beam for picture taking and viewing, 22, passes through a reflex prism 23 and the zoom part of optics 24 and 25 to a reflex mirror 26. Reflex mirror 26 is fully reflecting and is pivotable by 90° into two end positions. For the position shown in the figure, the rays from the object are guided through a set of lens elements 27, namely elements 27a, 27b and 27c, on either side of shutter 28 to film cassette 2. This is the picture taking position of the mirror. On the other hand, the position shown by dashed lines is that of observation, in which the rays are reflected to ocular 28a.

Objective focusing may be performed, for instance by adjusting the group 21 of front lens elements, as disclosed in U.S. Pat. No. 3,850,507. A diffraction grating 29 is mounted in an intermediate focus plane of the zoom part for focusing, which may be used for that purpose. This grating is mechanically connected with reflex mirror 26 so that it is removed every time from the path of rays when mirror 26 is pivoted from observation position into picture taking position.

Because of the extensive combination of the beams for viewing and picture taking, the required size of the camera is significantly less than in the embodiment of FIG. 1.

Figure 3:
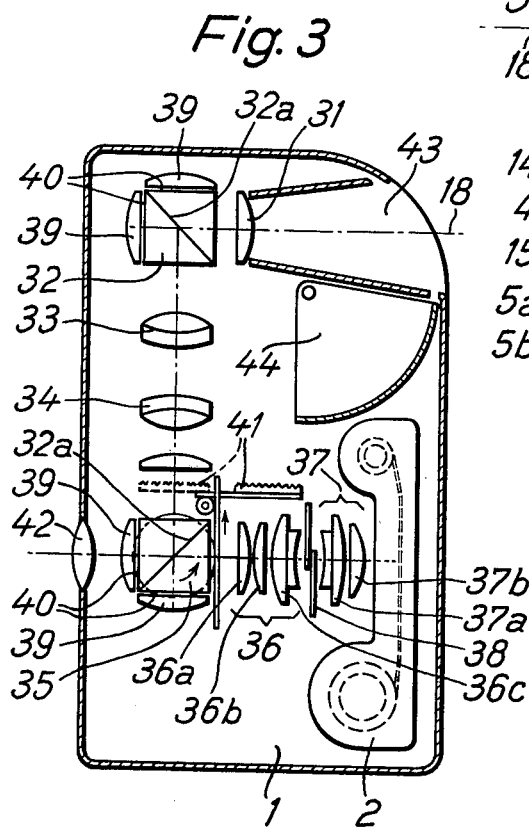
FIG. 3 is a mirror reflex pocket camera for narrow film, with zoom lens, as a third embodiment, wherein the zoom optics comprises two mirror lenses.

FIG. 3 shows an embodiment with essentially the same component arrangement. Here again the viewing and picture taking beams are extensively combined. However, the imaging optics no longer consist solely of refracting lens elements, rather mirror lenses also are employed.

Again the camera housing and film cassette are respectively designated by 1 and 2. The rays from the object first are incident through the front lens element 31 of the objective on a double splitting prism 32 where they are fully reflected and then through the zoom part 33, 34 of the objective they reach a second splitting mirror 35, and finally through further sets of lens elements 36, namely elements 36a, 36b and 36c, and 37, namely 37a and 37b, and shutter 38 they arrive at the film.

The design of splitting prisms 32 and 35 is known from German PS No. 1,961, 128. They are provided with a polarizing splitting layer 32a and with one mirror lens 39 at each of two adjacent prism surfaces. One quarter wave plate 40 each is mounted between both prism surfaces and mirror lenses. Depending on the polarization, the polarizing splitting layer will reflect or transmit one part of the light, which then is reflected in the mirror lenses and rotated by 90° in their polarization plane by the quarter wave plates, so that upon the new incidence of the rays on splitting layer 32a, the originally reflected part of the rays now is transmitted whereas the originally transmitted part now is reflected.

The second splitting prism 35 also may rotate and may be switched from one to another of two end positions. In the position shown in the figure, the rays are reflected to the film (picture taking position), while they are deflected to ocular 42 in the other.

Again a grating 41 is provided for properly focusing the objective. As in the embodiment of FIG. 2, this grating also must be removed from the path of the beam when a picture is being taken. In this case, too, it is mechanically connected with rotating splitting prism 35 so that it is always removed from the beam path when splitting prism 35 is rotated into the picture taking position.

Using splitting prism 35 together with the mirror lens provides a relatively large space in front of lens element 31. This space is designed as a backlight stop in conformity with the invention and may be covered by means of flap 44 pivotably linked to the camera housing.

Figure 4:
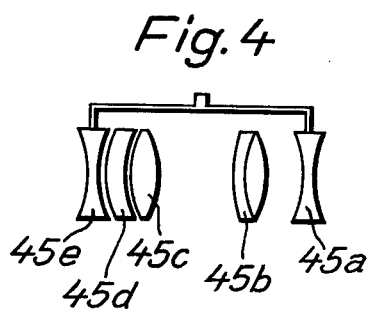
FIG. 4 shows the zoom inverting optics in the form of distance systems.

FIG. 4 illustrates the design of the zoom inverting optics as telephoto lens systems, comprising elements 45a– 45 e, where elements 45e and 45a are adjustable and coupled to each other.

We claim:
1. In a photographic mirror reflex still pocket camera having a picture taking objective, an optical axis thereof defining the picture taking direction, means in said camera for inserting a film cassette, a film plane in said cassette, and shutter means disposed in front of said film plane, the improvement comprising:
   a. first means for deflecting said optical axis parallel to said film plane and transverse to said picture taking direction defining a first deflected optical axis:
   b. a zoom means located along said first deflected optical axis;
   c. second means for deflecting said first deflected optical axis defining a second deflected optical axis, said second deflected optical axis being directed perpendicularly to the center of said film plane; and
   d. beam splitting means arranged in the path of said second deflected optical axis for deflecting a portion of the light rays defining said second deflected optical axis, said portion defining a view beam path.

2. The photographic still pocket camera of claim 1, comprising said zoom lens means having movable lens elements located along said first deflected optical axis.

3. The photographic still pocket camera of claim 2, comprising said cassette having a feed spool, a take-up spool and a film guide ledge connecting said spools.

4. The photographic still pocket camera of claim 2, comprising said cassette having a feed part, a take-up part and a film guide ledge connecting said feed and take-up parts.

5. The photographic still pocket camera of claim 2, wherein at least one lens element (5a) is provided for focusing having means for adjustment along said first deflected optical axis.

6. The photographic still pocket camera of claim 2, comprising a mirror reflex camera having second means for deflecting said first deflected optical axis defining a second optical axis, third means for deflecting said second deflected optical axis defining a third deflected optical axis, and fourth means for deflecting said third deflected optical axis defining a viewer beam path.

7. The photographic still pocket camera of claim 6, wherein said third means for deflecting is a fixed splitter mirror (6).

8. The photographic still pocket camera of claim 6, wherein said zoom lens means comprising a zoom objective having lens elements defining imaging optics.

9. The photographic mirror reflex still pocket camera of claim 1, comprising means within said zoom lens means for generating at least one real intermediary image.

10. The photographic mirror reflex still pocket camera of claim 9, wherein said real intermediary image is smaller than an image projected on said film plane.

11. The photographic mirror reflex still pocket camera of claim 1, wherein said zoom lens means comprise a zoom objective with zoom intermediate imaging defining a terrestrial telescope.

12. In a photographic mirror reflex still pocket camera having a picture taking objective, an optical axis thereof defining the picture taking direction, means in said camera for inserting a film cassette, a film plane in said cassette and shutter means disposed in front of said film plane, the improvement comprising:
   a. first means for deflecting said optical axis parallel to said film plane and transverse to said picture taking direction defining a first deflected optical axis;
   b. zoom lens means located along said first deflected optical axis; and
   c. reflecting components located along said first deflected optical axis defining a second deflected optical axis, said components being rotatable by 90° between two positions, the first of which reflects rays from the object to the film plane and the second of which reflects said rays into an ocular.

13. The photographic mirror reflex still pocket camera of claim 12, wherein an indicator (29, 41) for focusing the objective to the particular object distance is provided in the beam path defined by said first deflected optical axis at an intermediate image plane of said objective and in that said indicator is ganged to rotating, reflecting component (26) so that upon rotation of said component into the picture taking position, said indicator is removed from the beam path.

14. The photographic mirror reflex still pocket camera of claim 12, wherein said zoom lens means comprise a zoom objective having imaging optics comprising at least one mirror system consisting of a splitting prism (32 or 35) with a polarizing interference layer (32a) and provided with one mirror lens (39) each at both adjacent prism surfaces, a quarter wave plate (40) being inserted in every case.

15. The photographic still pocket camera of claim 14, wherein a splitting prism (35) is mounted in a straight line in front of an image window and is rotatable by 90° between two positions, in one of which it reflects the rays coming from the object to the film plane and in the other of which it reflects these rays into an ocular (42).

16. The photographic still pocket camera of claim 15, wherein an indicator (29, 41) for focusing the objective to the particular object distance is provided in the beam path of said objective and at an intermediate image plane, and in that said indicator is ganged to rotating, reflecting splitting prism (35) so that upon rotation of said prism into the picture taking position, said indicator is removed from the beam path.

17. The photographic mirror reflex still pocket camera of claim 14, wherein said imaging optics of the zoom objective comprise two of said mirror systems (32,35), said second system constituting said rotatable reflecting component.

18. The photographic still pocket camera of claim 17, wherein a space in said camera is available in front of said second mirror system defining a backlight stop (43) and closed by a pivoting lid (44).

* * * * *